US012691788B2

(12) United States Patent
Sakata et al.

(10) Patent No.: US 12,691,788 B2
(45) Date of Patent: Jul. 28, 2026

(54) CONTROL DEVICE

(71) Applicant: SUBARU CORPORATION, Tokyo (JP)

(72) Inventors: Shinnosuke Sakata, Tokyo (JP); Hirofumi Yabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 54 days.

(21) Appl. No.: 19/044,763

(22) Filed: Feb. 4, 2025

(65) Prior Publication Data

US 2025/0178481 A1 Jun. 5, 2025

Related U.S. Application Data

(63) Continuation of application No. PCT/JP2023/026307, filed on Jul. 18, 2023.

(51) Int. Cl.
*B60L 58/18* (2019.01)
*B60L 50/60* (2019.01)
(Continued)

(52) U.S. Cl.
CPC .............. *B60L 58/18* (2019.02); *B60L 50/60* (2019.02); *B60R 16/033* (2013.01); *H01M 10/46* (2013.01); *H01M 10/486* (2013.01); *B60L 2240/545* (2013.01); *B60L 2240/547* (2013.01); *H01M 2220/20* (2013.01)

(58) Field of Classification Search
CPC .... B60L 58/18; B60L 50/60; B60L 2240/545; B60L 2240/547; B60R 16/033; H01M 10/46; H01M 10/486; H01M 2220/20
See application file for complete search history.

(56) References Cited

U.S. PATENT DOCUMENTS

2012/0268068 A1* 10/2012 Jung ...................... B60L 53/00
                                                                        320/109
2013/0127400 A1* 5/2013 Oh .......................... B60L 3/003
                                                                        320/104

(Continued)

FOREIGN PATENT DOCUMENTS

JP        2014-090630 A        5/2014

OTHER PUBLICATIONS

International Search Report issued in corresponding International Patent Application No. PCT/JP2023/026307, dated Oct. 10, 2023.

*Primary Examiner* — Naeem Taslim Alam
(74) *Attorney, Agent, or Firm* — Rimon P.C.

(57) ABSTRACT

A control device for a vehicle includes auxiliary equipment, an auxiliary battery, at least one processor, and at least one memory coupled to the at least one processor. The auxiliary battery is configured to store electric power to be supplied to the auxiliary equipment. The processor is configured to execute processing including: temporarily executing voltage determination for determining whether a voltage of the auxiliary battery is equal to or less than a threshold in a situation where an ignition of the vehicle is turned off; executing charging control for charging the auxiliary battery when it is determined in the voltage determination that the voltage is equal to or less than the threshold; and setting a determination timing at which the voltage determination is executed based on an operating state of the auxiliary equipment.

10 Claims, 4 Drawing Sheets

(51) Int. Cl.
    B60R 16/033        (2006.01)
    H01M 10/46        (2006.01)
    H01M 10/48        (2006.01)

(56)           References Cited

U.S. PATENT DOCUMENTS

2020/0108820 A1 *   4/2020   Shin ..................... B60H 1/2218
2022/0009357 A1 *   1/2022   Kawai .................... B60L 50/60
2024/0424952 A1 *  12/2024   Pang ...................... B60L 58/22

* cited by examiner

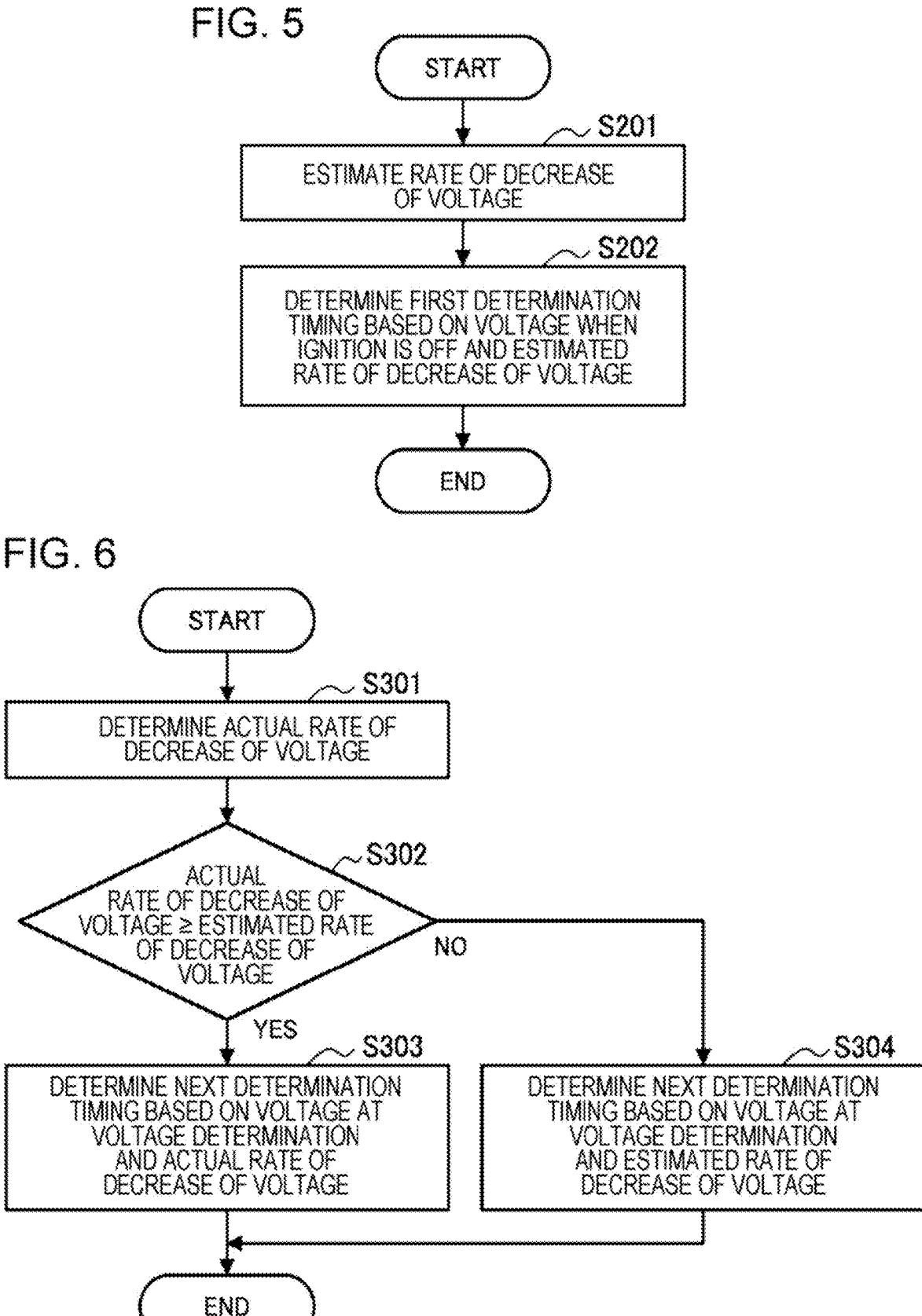

FIG. 5

START

~S201

ESTIMATE RATE OF DECREASE
OF VOLTAGE

~S202

DETERMINE FIRST DETERMINATION
TIMING BASED ON VOLTAGE WHEN
IGNITION IS OFF AND ESTIMATED
RATE OF DECREASE OF VOLTAGE

END

FIG. 6

START

~S301

DETERMINE ACTUAL RATE OF
DECREASE OF VOLTAGE

~S302

ACTUAL
RATE OF DECREASE OF
VOLTAGE ≥ ESTIMATED RATE
OF DECREASE OF
VOLTAGE

NO

YES

~S303

DETERMINE NEXT DETERMINATION
TIMING BASED ON VOLTAGE AT
VOLTAGE DETERMINATION
AND ACTUAL RATE OF
DECREASE OF VOLTAGE

~S304

DETERMINE NEXT DETERMINATION
TIMING BASED ON VOLTAGE AT
VOLTAGE DETERMINATION
AND ESTIMATED RATE OF
DECREASE OF VOLTAGE

END

CONTROL DEVICE

CROSS-REFERENCE TO RELATED APPLICATIONS

This application is continuation of International Application No. PCT/JP2023/026307, filed on Jul. 18, 2023, the entire contents of which are hereby incorporated by reference.

BACKGROUND

The disclosure relates to a control device.

Vehicles are equipped with auxiliary equipment such as room lamps. Such auxiliary equipment operates by using the electric power from auxiliary batteries installed in the vehicles. In the case where a vehicle is parked for a long period of time, there is a possibility that the electric power stored in an auxiliary battery will decrease due to natural discharge and become depleted. Accordingly, in order to suppress depletion of the electric power of an auxiliary battery, for example, as described in Japanese Unexamined Patent Application Publication No. 2014-090630, there has been proposed a technology relating to charging control for charging an auxiliary battery in a situation where the ignition of the vehicle is turned off.

SUMMARY

An aspect of the disclosure provides a control device for a vehicle. The control device includes auxiliary equipment, an auxiliary battery, at least one processor, and at least one memory coupled to the at least one processor. The auxiliary battery is configured to store electric power to be supplied to the auxiliary equipment. The processor is configured to execute processing including: temporarily executing voltage determination for determining whether a voltage of the auxiliary battery is equal to or less than a threshold in a situation where an ignition of the vehicle is turned off; executing charging control for charging the auxiliary battery when it is determined in the voltage determination that the voltage is equal to or less than the threshold; and setting a determination timing at which the voltage determination is executed based on an operating state of the auxiliary equipment.

BRIEF DESCRIPTION OF THE DRAWINGS

The accompanying drawings are included to provide a further understanding of the disclosure, and are incorporated in and constitute a part of this specification. The drawings illustrate an embodiment and, together with the specification, serve to explain the principles of the disclosure.

FIG. 5 is a flowchart illustrating an example of a flow of processing for setting a first determination timing that is performed by the control device according to the embodiment of the disclosure.

FIG. 6 is a flowchart illustrating an example of a flow of processing for setting the next determination timing that is performed by the control device according to the embodiment of the disclosure.

DESCRIPTION OF EMBODIMENTS

DETAILED DESCRIPTION

Figure 1:
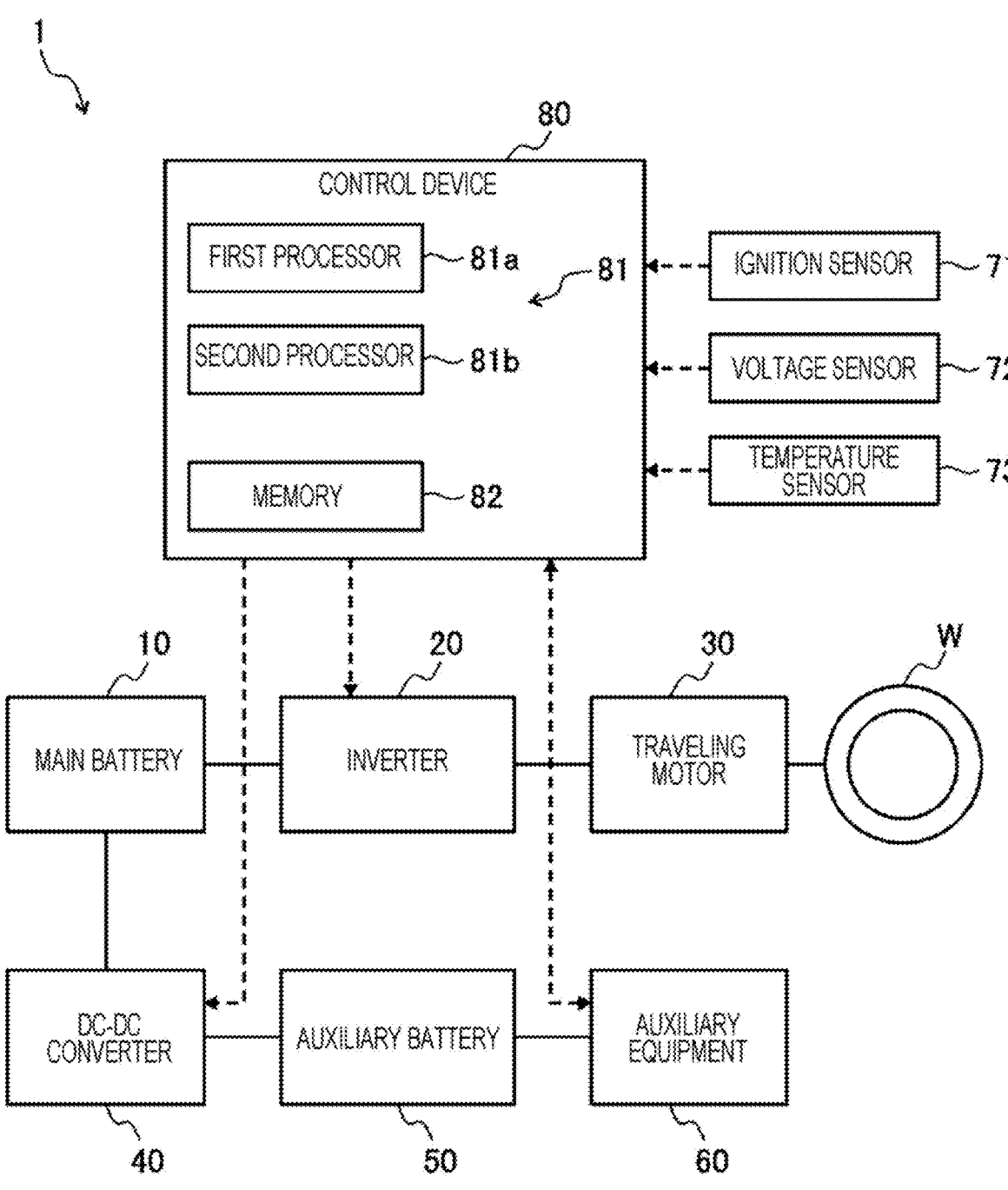
FIG. 1 is a schematic diagram illustrating a schematic configuration of a vehicle according to an embodiment of the disclosure.

There is a case where a vehicle is parked in a state where auxiliary equipment, such as a room lamp, is operating. In this case, there is a possibility that the electric power stored in an auxiliary battery will decrease and become depleted due to the continued operation of the auxiliary equipment. Consequently, also in such a case, it is desired to suppress depletion of the electric power of the auxiliary battery.

Accordingly, it is desirable to provide a control device capable of suppressing depletion of the electric power of an auxiliary battery.

An embodiment of the disclosure will be described in detail below with reference to the accompanying drawings. Specific dimensions, materials, numerical values, and the like illustrated in the embodiment are merely examples for ease of understanding of the disclosure and do not limit the disclosure unless otherwise specified. Note that, in the present specification and the drawings, elements that have substantially the same functions and configurations are denoted by the same reference signs, and repeated descriptions thereof will be omitted. In addition, elements that do not directly relates to the disclosure are not illustrated in the drawings.

Configuration of Vehicle

A configuration of a vehicle 1 according to the embodiment of the disclosure will be described below with reference to FIG. 1 and FIG. 2.

FIG. 1 is a schematic diagram illustrating a schematic configuration of the vehicle 1. As illustrated in FIG. 1, the vehicle 1 includes a main battery 10, an inverter 20, a traveling motor 30, a DC-DC converter 40, an auxiliary battery 50, an auxiliary equipment 60, an ignition sensor 71, a voltage sensor 72, a temperature sensor 73, and a control device 80.

The vehicle 1 is an electric automobile that includes the traveling motor 30 as a driving source. However, the vehicle 1 that will be described below is merely an example of the vehicle according to the disclosure, and as will be described later, the vehicle according to the disclosure may be a hybrid vehicle or an internal combustion engine vehicle.

The main battery 10 stores electric power that is to be supplied to the traveling motor 30. The main battery 10 is, for example, a secondary battery such as a lithium-ion battery or a nickel-hydrogen battery. The main battery 10 is coupled to the traveling motor 30 via the inverter 20.

The inverter 20 is a power conversion device that is capable of converting electric power between direct current and alternating current. The inverter 20 includes, for example, a polyphase bridge circuit. The inverter 20 is capable of converting direct-current power supplied from the main battery 10 into alternating-current power and supplying the alternating-current power to the traveling motor 30. The inverter 20 is provided with a switching element, and supply of the electric power between the main battery 10 and the traveling motor 30 is controlled by controlling the operation of the switching element.

The traveling motor 30 can output power for driving driving wheels W of the vehicle 1. The traveling motor 30 is, for example, a polyphase alternating-current motor, such as a three-phase alternating-current motor. The traveling motor 30 generates power by using the electric power supplied thereto from the main battery 10 via the inverter 20. Note that the traveling motor 30 may have a regenerative function that is a function of serving as a power generator that generates electricity by using the rotational energy of the driving wheels W during deceleration of the vehicle 1. In this case, the alternating-current power that is generated by regenerative power generation performed by the traveling motor 30 is converted into a direct-current power by the inverter 20 and supplied to the main battery 10.

The DC-DC converter 40 is a voltage conversion device that is capable of performing voltage conversion. The DC-DC converter 40 is provided between the main battery 10 and the auxiliary battery 50. The DC-DC converter 40 can lower the voltage of the electric power stored in the main battery 10 and supply the electric power to the auxiliary battery 50. The DC-DC converter 40 includes, for example, a chopper circuit, and the voltage conversion performed by the DC-DC converter 40 is controlled by controlling the operation of a switching element included in the circuit.

The auxiliary battery 50 stores the electric power to be supplied to the auxiliary equipment 60. The auxiliary battery 50 is, for example, a secondary battery, such as a lead-acid battery or a lithium-ion battery. The auxiliary battery 50 is a battery having a voltage lower than that of the main battery 10. For example, the voltage of the auxiliary battery 50 is about 12 V when the auxiliary battery 50 is fully charged. The auxiliary battery 50 is coupled to the auxiliary equipment 60.

The auxiliary equipment 60 includes various devices that operate by using the electric power stored in the auxiliary battery 50. Examples of the auxiliary equipment 60 include lighting devices, such as a room lamp and headlamps, an air conditioner, and audio equipment.

The ignition sensor 71 detects the state of an ignition switch of the vehicle and outputs the detected state to the control device 80. A driver who drives the vehicle 1 can change the state of an electrical system of the vehicle 1 by performing an operation using the ignition switch. The driver of the vehicle 1 can switch the ignition of the vehicle 1 from on to off by performing an operation using the ignition switch. The driver of the vehicle 1 parks the vehicle 1 in a state where the ignition of the vehicle 1 is turned off. When the ignition of the vehicle 1 is turned off, at least the supply of the electric power from the main battery 10 to the traveling motor 30 cannot be performed, rendering vehicle 1 unable to travel. In addition, as will be described later, when the ignition of the vehicle 1 is turned off, power supply to a part of the control device 80 is stopped, and this restricts the functionality of the control device 80.

Note that, in the present specification, states in each of which the ignition is not turned off will be collectively referred to as a "state in which the ignition is turned on". However, the state in which the ignition is turned on may include multiple states among which the state of the electrical system of the vehicle 1 is different. These states may be distinguished from each other by different names. For example, a state in which the electric power can be supplied from the main battery 10 to the traveling motor 30 and a state in which the electric power cannot be supplied from the main battery 10 to the traveling motor 30 while all the auxiliary equipment 60 is operable may be distinguished from each other by different names.

The voltage sensor 72 detects the voltage of the auxiliary battery 50 and outputs the detected voltage to the control device 80.

The temperature sensor 73 detects the temperature of the auxiliary battery 50 and outputs the detected temperature to the control device 80.

The control device 80 includes at least one processor 81 and at least one memory 82 that is coupled to the processor 81. The processor 81 includes, for example, a central processing unit (CPU). The memory 82 includes, for example, a read only memory (ROM), a random access memory (RAM), and the like. The ROM is a memory device that stores programs, arithmetic parameters, and the like to be used by the CPU. The RAM is a memory device that temporarily stores data such as variables and parameters to be used in processing executed by the CPU.

In the case illustrated FIG. 1, the processor 81 includes a first processor 81*a* and a second processor 81*b*. The control device 80 includes a power supply. When the ignition of the vehicle 1 is turned off, electric power is supplied from the power supply to the first processor 81*a* while the electric power is not supplied from the power supply to the second processor 81*b*. In other words, when the ignition of the vehicle 1 is turned off, the functionality of the second processor 81*b* is basically limited. However, the first processor 81*a* and the second processor 81*b* may be collectively arranged in the single processor 81 without being clearly separated from each other.

The control device 80 communicates with the inverter 20, the DC-DC converter 40, the auxiliary equipment 60, the ignition sensor 71, the voltage sensor 72, and the temperature sensor 73. More specifically, the control device 80 can control the operations of the inverter 20, the DC-DC converter 40, and the auxiliary equipment 60 by outputting operation commands to these devices. In addition, the control device 80 can acquire information from the auxiliary equipment 60, the ignition sensor 71, the voltage sensor 72, and the temperature sensor 73. Communication between the control device 80 and each device is realized by using, for example, controller area network (CAN) communication.

Figure 2:
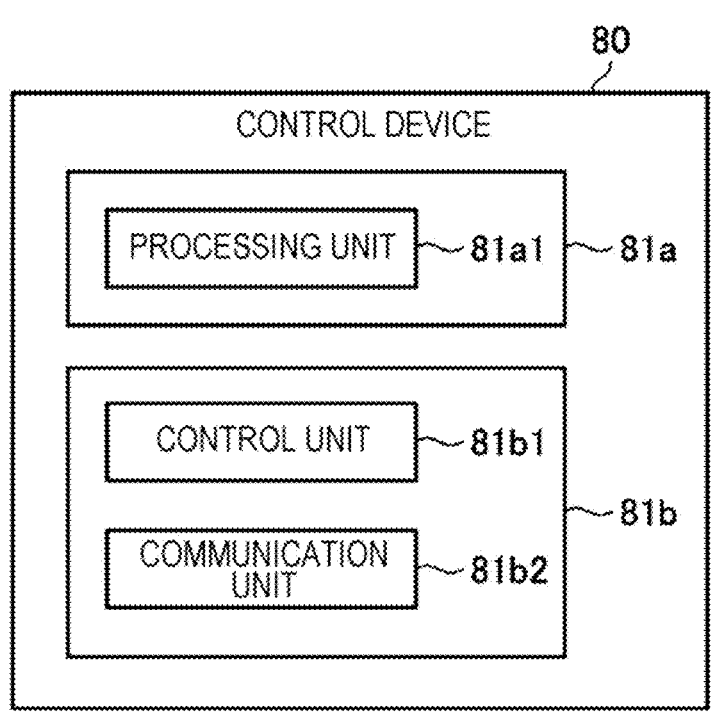
FIG. 2 is a block diagram illustrating an example of a functional configuration of a control device according to the embodiment of the disclosure.

FIG. 2 is a block diagram illustrating an example of the functional configuration of the control device 80. For example, as illustrated in FIG. 2, the control device 80 includes a processing unit 81*a*1, a control unit 81*b*1, and a communication unit 81*b*2.

Various processing operations including processing that will be described below and that is performed by the processing unit 81*a*1 may be executed by the first processor 81*a*. More specifically, the first processor 81*a* executes programs stored in the memory 82, so that various processing operations are executed by the processing unit 81*a*1.

Various processing operations including processing operations that will be described later and that are performed by the control unit 81*b*1 and the communication unit 81*b*2 may be executed by the second processor 81*b*. More specifically, the second processor 81*b* executes programs stored in the memory 82, so that various processing operations are executed by the control unit 81*b*1 and the communication unit 81*b*2.

Note that functions of the control device 80 according to the present embodiment may be allocated among a plurality of devices, or the functions may be implemented by a single device. In the case where the functions of the control device 80 are allocated among a plurality of devices, the plurality of devices may be coupled to each other via a communication bus such as a CAN.

The processing unit 81*a*1 has a function of waking up the second processor 81*b*. Waking up the second processor 81*b* refers to supplying electric power from the power supply of the control device 80 to the second processor 81*b* so as to enable the second processor 81*b* to exhibit its function.

The control unit 81*b*1 has a function of controlling the operation of each device included in the vehicle 1. More specifically, the control unit 81*b*1 can control the operations of the inverter 20, the DC-DC converter 40, and the auxiliary equipment 60 by outputting operation commands to these devices.

The communication unit 81*b*2 has a function of outputting various types of information. For example, the communication unit 81*b*2 can transmit information to an information processing terminal such as a smartphone carried by the driver who is a user of the vehicle 1.

Operation of Control Device

The operation of the control device 80 according to the embodiment of the disclosure will now be described with reference to FIG. 3 to FIG. 6.

As described above, the vehicle 1 is provided with the auxiliary equipment 60 that operates by using the electric power of the auxiliary battery 50. Here, after the ignition of the vehicle 1 has been turned off, in the case where the vehicle 1 is parked in a state where the auxiliary equipment 60 is operating, the electric power stored in the auxiliary battery 50 decreases due to the continued operation of the auxiliary equipment 60.

Figure 3:
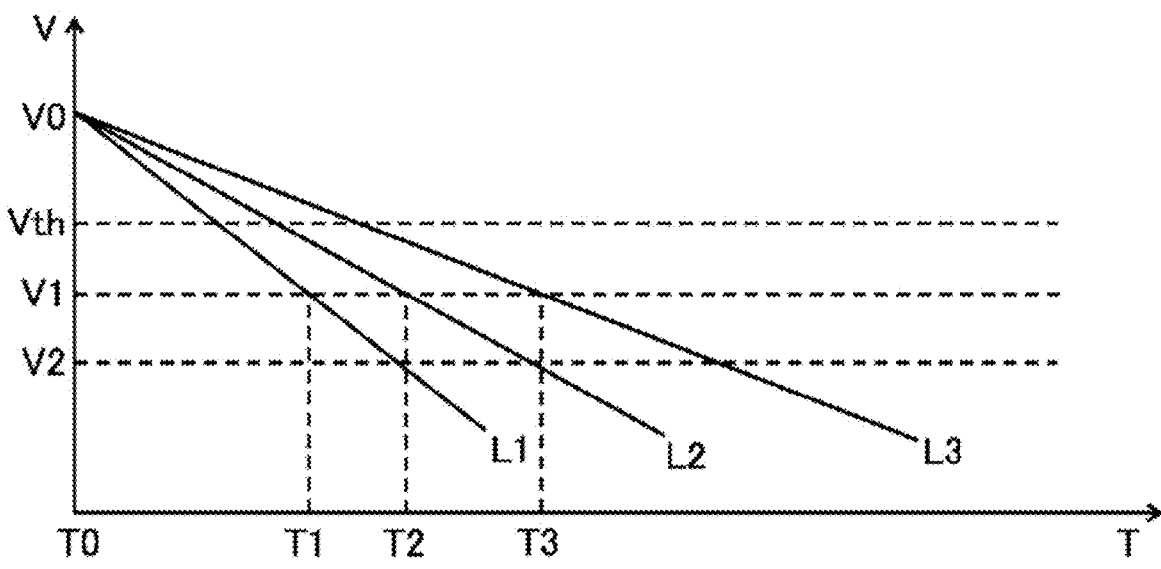
FIG. 3 is a graph illustrating an example of transition of a voltage of an auxiliary battery after the ignition of a vehicle according to a comparative example has been turned off.

FIG. 3 is a graph illustrating an example of transition of a voltage V of the auxiliary battery 50 after the ignition of the vehicle 1 according to a comparative example has been turned off. In FIG. 3, the horizontal axis denotes time T, and the vertical axis denotes the voltage V of the auxiliary battery 50.

In FIG. 3, a line L1, a line L2, and a line L3 each indicating a transition of the voltage V of the auxiliary battery 50 are illustrated. The line L1 indicates the transition of the voltage V in the case where headlamps and a room lamp among the auxiliary equipment 60 are both operating. The line L2 indicates the transition of the voltage V in the case where only the headlamps among the auxiliary equipment 60 are operating. The line L3 indicates the transition of the voltage V in the case where only the room lamp among the auxiliary equipment 60 is operating.

In the case illustrated in FIG. 3, the ignition is switched from on to off at a time point T0. At the time point T0, a voltage V0 is the voltage V of the auxiliary battery 50. In any of the cases indicated by the lines L1 to L3, after the time point T0, the voltage V of the auxiliary battery 50 decreases with time. Here, the rate of decrease of the voltage V is the greatest in the case of the line L1, the second greatest in the case of the line L2, and the lowest in the case of the line L3. As described above, the rate of decrease of the voltage V may vary depending on the operating state of the auxiliary equipment 60.

A voltage V1 in FIG. 3 is the voltage V that is required for turning on the ignition and enabling the supply of the electric power from the main battery 10 to the traveling motor 30. In other words, when the voltage V of the auxiliary battery 50 falls below the voltage V1, the electric power cannot be supplied from the main battery 10 to the traveling motor 30 even if the ignition cannot be turned on. A voltage V2 in FIG. 3 is the voltage V that ensures a proper operation of the control device 80. In other words, when the voltage V of the auxiliary battery 50 falls below the voltage V2, the control device 80 cannot operate properly. The voltage V2 is lower than the voltage V1.

As indicated by the line L1, when the ignition is turned off in a state where the headlamps and the room lamp are both operating, the voltage V of the auxiliary battery 50 falls below the voltage V1 at a time point T1. As indicated by the line L2, when the ignition is turned off in a state where only the headlamps are operating, the voltage V of the auxiliary battery 50 falls below the voltage V1 at a time point T2 that is after the time point T1. As indicated by the line L3, when the ignition is turned off in a state where only the room lamp is operating, the voltage V of the auxiliary battery 50 falls below the voltage V1 at a time point T3 that is after the time point T2. As described above, the timing at which the voltage V of the auxiliary battery 50 falls below the voltage V1 after the ignition has been turned off may vary depending on the operating state of the auxiliary equipment 60.

As mentioned above, after the ignition of the vehicle 1 has been turned off, there is a possibility that the electric power stored in the auxiliary battery 50 will become depleted due to the continued operation of the auxiliary equipment 60. Accordingly, in the present embodiment, in a situation where the ignition of the vehicle 1 is turned off, the control unit 81*b*1 temporarily executes a voltage determination for determining whether the voltage V of the auxiliary battery 50 is equal to or less than a threshold Vth. The threshold Vth is greater than the voltage V1. When it is determined in the voltage determination that the voltage V is equal to or less than the threshold Vth, the control unit 81*b*1 executes charging control for charging the auxiliary battery 50. Here, in the present embodiment, as will be described later, by refining the processing for setting a determination timing at which the voltage determination is executed, suppression of depletion of the electric power of the auxiliary battery 50 is achieved. Processing that relates to the charging control performed by the control device 80 will be described below.

Figure 4:
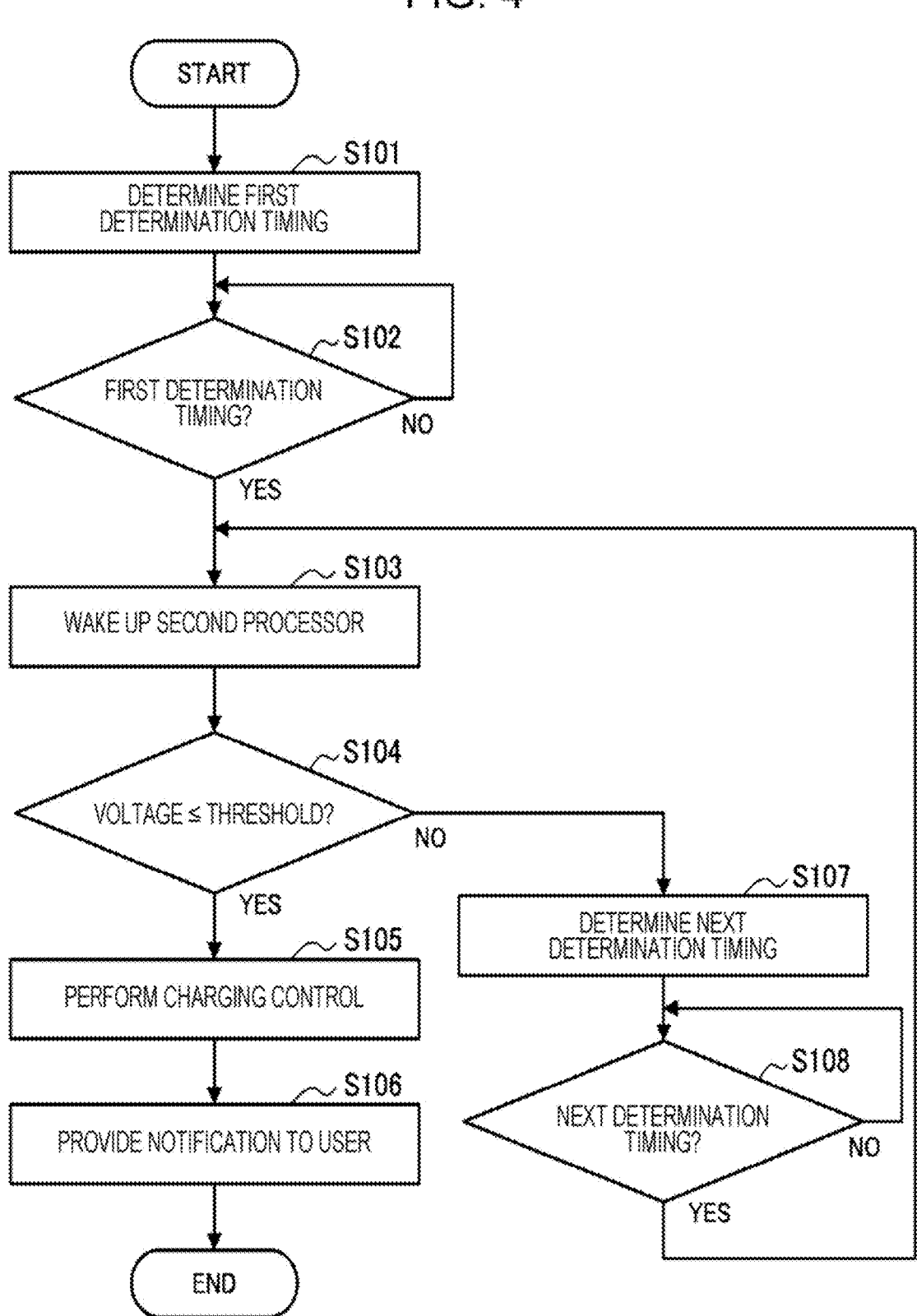
FIG. 4 is a flowchart illustrating an example of the overall flow of processing that is performed by the control device according to the embodiment of the disclosure.

FIG. 4 is a flowchart illustrating an example of the overall flow of processing that is performed by the control device 80. The control flow illustrated in FIG. 4 is started when the ignition of the vehicle 1 is switched from on to off. Note that, for example, the control device 80 can determine that the ignition of the vehicle 1 is switched from on to off on the basis of a detection result obtained by the ignition sensor 71.

Once the control flow illustrated in FIG. 4 has been started, the processing unit 81*a*1 first sets a first determination timing of the voltage determination in step S101.

FIG. 5 is a flowchart illustrating an example of a flow of processing for setting the first determination timing that is performed by the control device 80. The control flow illustrated in FIG. 5 is executed in step S101 in the control flow illustrated in FIG. 4.

Once the control flow illustrated in FIG. 5 has been started, the processing unit 81*a*1 first estimates the rate of decrease of the voltage V in step S201.

In step S201, the processing unit 81*a*1 estimates the rate of decrease of the voltage V on the basis of the operating state of the auxiliary equipment 60. The processing unit 81*a*1 estimates the rate of decrease of the voltage V on the basis of, for example, the type of the auxiliary equipment 60 that is operating. For example, when only the headlamps are operating, the processing unit 81*a*1 estimates that the rate of decrease of the voltage V corresponds to a presumed rate of decrease when only the headlamps are caused to operate. For example, when only the room lamp is operating, the processing unit 81*a*1 estimates that the rate of decrease of the voltage V corresponds to a presumed rate of decrease when only the room lamp is caused to operate. For example, when the head lamps and the room lamp are both operating, the processing unit 81*a*1 estimates that the rate of decrease of the voltage V corresponds to the sum of the presumed rate of decrease when only the headlamps are caused to operate and the presumed rate of decrease when only the room lamp is caused to operate.

Note that, if operation modes with different power consumption amounts can be selected in the same auxiliary equipment 60, the processing unit 81*a*1 may estimate the rate of decrease of the voltage V by taking into account the operating mode of the auxiliary equipment 60, which is operating. For example, if an operating mode in which the entire room lamp is turned on and an operating mode in which only part of the room lamp is turned on can be selected, when the room lamp is operating, the processing unit 81*a*1 may estimate the rate of decrease of the voltage V by taking the operating mode of the room lamp into account.

Here, the rate of decrease of the voltage V varies depending on a resistance value in an electric circuit formed by the auxiliary battery 50 and the auxiliary equipment 60. Thus, the processing unit 81*a*1 may estimate the rate of decrease of the voltage V by taking into account various parameters that affect the resistance value in such an electric circuit.

For example, the processing unit 81*a*1 may estimate the rate of decrease of the voltage V on the basis of the temperature of the auxiliary battery 50 in addition to the operating state of the auxiliary equipment 60. The internal resistance of the auxiliary battery 50 may change in accordance with the temperature of the auxiliary battery 50. Thus, for example, even in the case of the same operating state of the auxiliary equipment 60, the processing unit 81*a*1 may vary the estimated rate of decrease of the voltage V on the basis of the temperature of the auxiliary battery 50. Note that the control device 80 can acquire the temperature of the auxiliary battery 50 on the basis of, for example, a detection result obtained by the temperature sensor 73.

In addition, for example, the processing unit 81*a*1 may estimate the rate of decrease of the voltage V on the basis of the degree of degradation of the auxiliary battery 50 in addition to the operating state of the auxiliary equipment 60. The internal resistance of the auxiliary battery 50 may change in accordance with the degree of degradation of the auxiliary battery 50. Thus, for example, even in the case of the same operating state of the auxiliary equipment 60, the processing unit 81*a*1 may vary the estimated rate of decrease of the voltage V on the basis of the degree of degradation of the auxiliary battery 50. Note that the processing unit 81*a*1 can estimate the degree of degradation of the auxiliary battery 50 on the basis of, for example, the elapsed time since the production of the auxiliary battery 50.

The temperature of the auxiliary battery 50 and the degree of degradation of the auxiliary battery 50 have each been mentioned above as information that can be taken into account in addition to the operating state of the auxiliary equipment 60 in the processing for estimating the rate of decrease of the voltage V. However, in the processing for estimating the rate of decrease of the voltage V, the processing unit 81*a*1 may use a plurality of types of information as information items that can be taken into account in addition to the operating state of the auxiliary equipment 60. For example, the processing unit 81*a*1 may estimate the rate of decrease of the voltage V on the basis of the temperature of the auxiliary battery 50 and the degree of degradation of the auxiliary battery 50 in addition to the operating state of the auxiliary equipment 60. In addition, in the processing for estimating the rate of decrease of the voltage V, the processing unit 81*a*1 may use information other than the above-mentioned information items as information that can be taken into account in addition to the operating state of the auxiliary equipment 60. For example, in the processing for estimating the rate of decrease of the voltage V, the processing unit 81*a*1 may use, as information that can be taken into account in addition to the operating state of the auxiliary equipment 60, information relating to the resistance of a harness coupling the auxiliary battery 50 and the auxiliary equipment 60 to each other.

Next, in step S202, the processing unit 81*a*1 sets the first determination timing of the voltage determination, which occurs after the ignition has been turned off, on the basis of the voltage V when the ignition is turned off and the estimated rate of decrease of the voltage V, and the control flow illustrated in FIG. 5 ends. Note that the phrase "when the ignition is turned off" refers to a timing at which the ignition is switched from on to off and is turned off.

In step S202, for example, the processing unit 81*a*1 sets a timing at which the voltage V is presumed to fall below the threshold Vth to be the first determination timing of the voltage determination. For example, the processing unit 81*a*1 divides the difference between the voltage V and the threshold Vth when the ignition is turned off by the estimated rate of decrease of the voltage V estimated in step S201. The value obtained in this manner corresponds to a period of time from the timing at which the ignition is turned off until the timing at which the voltage V is presumed to fall below the threshold Vth. Then, the processing unit 81*a*1 sets the timing at which this period of time has elapsed from the timing at which the ignition is turned off to be the first determination timing of the voltage determination. Note that the control device 80 can acquire the voltage V at each point in time on the basis of, for example, a detection result obtained by the voltage sensor 72.

After step S101 in FIG. 4, in step S102, the processing unit 81*a*1 determines whether the first determination timing of the voltage determination has come. Note that, as described above, in a situation where the ignition is turned off, the electric power is supplied from the power supply of the control device 80 to the first processor 81*a* that implements the function of the processing unit 81*a*1. Thus, the processing unit 81*a*1 can count time.

If it is determined that the first determination timing of the voltage determination has not yet come (NO in step S102), step S102 is repeated. In contrast, if it is determined that the first determination timing of the voltage determination has come (YES in step S102), the process proceeds to step S103.

If the determination result in step S102 is YES, the processing unit 81*a*1 wakes up the second processor 81*b* in step S103. In other words, the processing unit 81*a*1 causes the electric power to be supplied from the power supply of the control device 80 to the second processor 81*b* so as to enable the second processor 81*b* to exhibit its function. Accordingly, the second processor 81*b* can exhibit the function of the control unit 81*b*1 and the function of the communication unit 81*b*2.

Next, in step S104, the control unit 81*b*1 temporarily executes the voltage determination so as to determine whether the voltage V is equal to or less than the threshold Vth.

If it is determined that the voltage V is equal to or less than the threshold Vth (YES in step S104), the process proceeds to step S105. In contrast, if it is determined that the voltage V is greater than the threshold Vth (NO in step S104), the process proceeds to step S107.

As described above, the first determination timing of the voltage determination is set to be the timing at which the voltage V is presumed to fall below the threshold Vth. Thus, in the case where the transition of the voltage V does not deviate significantly from a presumed transition, the determination result in step S104 will typically be YES. If the determination result in step S104 is YES, the control unit 81*b*1 executes the charging control in step S105.

In step S105, the control unit 81*b*1 charges the auxiliary battery 50 by controlling the operation of the DC-DC converter 40 in the charging control. More specifically, in the charging control, the control unit 81*b*1 causes the electric power to be supplied from the main battery 10 to the auxiliary battery 50 via the DC-DC converter 40. As a result, the auxiliary battery 50 is charged.

In the charging control, for example, the control unit 81*b*1 charges the auxiliary battery 50 for a predetermined period of time. Then, the control unit 81*b*1 terminates the charging control when the above-mentioned period of time has elapsed from the start of the charging control. However, the control unit 81*b*1 may terminate the charging control before the above-mentioned period of time elapses from the start of the charging control if the remaining capacity of the auxiliary battery 50 reaches a target remaining capacity. The target remaining capacity is preset by, for example, the driver of the vehicle 1.

Next, in step S106, the communication unit 81*b*2 provides a notification to the driver of the vehicle 1, who is the user, and the control flow illustrated in FIG. 4 ends.

In step S106, the communication unit 81*b*2 outputs information relating to the operating state of the auxiliary equipment 60 and notifies the driver of the vehicle 1 of this information. For example, the communication unit 81*b*2 transmits the information relating to the operating state of the auxiliary equipment 60 to the information processing terminal, such as a smartphone, carried by the driver of the vehicle 1 and causes the information processing terminal to display the information. Examples of the information that relates to the operating state of the auxiliary equipment 60 and that is notified to the driver include information indicating the type of the auxiliary equipment 60 that is operating. By outputting such information, the driver can be prompted to return to the vehicle 1 and stop the operation of the auxiliary equipment 60.

As described above, the first determination timing of the voltage determination is set to be the timing at which the voltage V is presumed to fall below the threshold Vth. However, when the transition of the voltage V deviates significantly from the presumed transition, the determination result in step S104 may sometimes be NO. If the determination result in step S104 is NO, the processing unit 81*a*1 sets the next determination timing of the voltage determination in step S107. Note that, if the determination result in step S104 is NO, the processing unit 81*a*1 stops the supply of the electric power from the power supply of the control device 80 to the second processor 81*b*.

FIG. 6 is a flowchart illustrating an example of a flow of processing for setting the next determination timing that is performed by the control device 80. The control flow illustrated in FIG. 6 is executed in step S107 of the control flow illustrated in FIG. 4.

Once the control flow illustrated in FIG. 6 has been started, the processing unit 81*a*1 first identifies an actual rate of decrease of the voltage V in step S301.

As will be described later, step S107 and step S108 in FIG. 4 are repeated while the determination result in step S104 in FIG. 4 continues to be NO. For example, in the case where the most recent voltage determination is the first voltage determination, in step S301, the processing unit 81*a*1 divides the difference between the voltage V when the ignition is turned off and the voltage V at the first voltage determination by a period of time between the timing at which the ignition is turned off and the first determination timing of the voltage determination. Then, the processing unit 81*a*1 identifies the value obtained in this manner as the actual rate of decrease of the voltage V.

For example, in the case where the most recent voltage determination is the second or subsequent voltage determination, in step S301, the processing unit 81*a*1 divides the difference between the voltage V at the voltage determination that is performed immediately before the most recent voltage determination and the voltage V at the most recent voltage determination by a period of time between the determination timing of the voltage determination that is performed immediately before the most recent voltage determination and the determination timing of the most recent voltage determination. Then, the processing unit 81*a*1 identifies the value obtained in this manner as the actual rate of decrease of the voltage V.

Next, in step S302, the processing unit 81*a*1 determines whether the actual rate of decrease of the voltage V is equal to or greater than an estimated rate of decrease of the voltage V. Note that, for example, the processing unit 81*a*1 can use the estimated rate of decrease of the voltage V estimated in step S201 in FIG. 5 as the estimated rate of decrease of the voltage V in step S302.

If it is determined that the actual rate of decrease of the voltage V is equal to or larger than the estimated rate of decrease of the voltage V (YES in step S302), the process proceeds to step S303. In contrast, if it is determined that the estimated rate of decrease of the voltage V is greater than the actual rate of decrease of the voltage V (NO in step S302), the process proceeds to step S304.

If the determination result in step S302 is YES, in step S303, the processing unit 81*a*1 sets the next determination timing of the voltage determination on the basis of the voltage V at the most recent voltage determination and the actual rate of decrease of the voltage V, and the control flow illustrated in FIG. 6 ends.

In step S303, for example, the processing unit 81*a*1 sets the timing at which the voltage V is presumed to fall below the threshold Vth to be the next determination timing of the voltage determination. For example, the processing unit 81*a*1 divides the difference between the voltage V and the threshold Vth at the most recent voltage determination by the actual rate of decrease of the voltage V identified in step S301. The value obtained in this manner corresponds to a period of time from the determination timing of the most recent voltage determination to the timing at which the voltage V is presumed to fall below the threshold Vth. Then, the processing unit 81*a*1 sets the timing at which this period of time has elapsed from the determination timing of the most recent voltage determination to be the next determination timing of the voltage determination.

When it is determined as NO in step S302, in step S304, the processing unit 81*a*1 sets the next determination timing of the voltage determination on the basis of voltage V at the most recent voltage determination and the estimated rate of decrease of the voltage V, and the control flow illustrated in FIG. 6 ends.

Similar to step S303, in step S304, the processing unit 81a1 sets, for example, the timing at which the voltage V is presumed to fall below the threshold Vth to be the next determination timing of the voltage determination. For example, the processing unit 81a1 divides the difference between the voltage V and the threshold Vth at the most recent voltage determination by the estimated rate of decrease of the voltage V estimated in step S201. The value obtained in this manner corresponds to a period of time from the determination timing of the most recent voltage determination to the timing at which the voltage V is presumed to fall below the threshold Vth. Then, the processing unit 81a1 sets the timing at which this period of time has elapsed from the determination timing of the most recent voltage determination to be the next determination timing of the voltage determination.

After step S107 in FIG. 4, in step S108, the processing unit 81a1 determines whether the next determination timing of the voltage determination has come.

If it is determined that the next determination timing of the voltage determination has not yet come (NO in step S108), step S108 is repeated. In contrast, if it is determined that the next determination timing of the voltage determination has come (YES in step S108), the process returns to step S103.

As described above, in the control device 80 according to the present embodiment, in a situation where the ignition of the vehicle 1 is turned off, the control unit 81b1 temporarily executes the voltage determination for determining whether the voltage V of the auxiliary battery 50 is equal to or less than the threshold Vth. When it is determined in the voltage determination that the voltage V is equal to or less than the threshold Vth, the control unit 81b1 executes the charging control for charging the auxiliary battery 50. Here, the processing unit 81a1 sets the determination timing at which the voltage determination is executed on the basis of the operating state of the auxiliary equipment 60.

As a result, the timing at which the second processor 81b is woken up and at which the voltage determination is executed can be changed in accordance with the operating state of the auxiliary equipment 60. Consequently, the voltage determination can be executed at a timing close to the timing at which the voltage V of the auxiliary battery 50 falls below the threshold Vth. Therefore, even if the ignition of the vehicle 1 is turned off in a state where the auxiliary equipment 60 is operating, depletion of the electric power of the auxiliary battery 50 can be suppressed.

In addition, since the timing at which the second processor 81b is woken up and at which the voltage determination is executed can be changed in accordance with the operating state of the auxiliary equipment 60, the execution of unnecessarily voltage determination at an excessively high frequency can be suppressed, and unnecessary power consumption associated with the wake-up of the second processor 81b can also be suppressed.

The example of the processing performed by the control device 80 has been described above with reference to the flowcharts illustrated in FIG. 4 to FIG. 6. However, the processing performed by the control device 80 is not limited to the above example.

For example, in the above description, the case has been described in which the processing unit 81a1 sets the timing at which the voltage V is presumed to fall below the threshold Vth to be the first determination timing of the voltage determination in step S202 in FIG. 5. However, the processing unit 81a1 may set a timing earlier or later than the timing at which the voltage V is presumed to fall below the threshold Vth to be the first determination timing of the voltage determination.

In addition, for example, in the above description, the case has been described in which the processing unit 81a1 sets the timing at which the voltage V is presumed to fall below the threshold Vth to be as the next determination timing of the voltage determination in step S303 and step S304 in FIG. 6. However, the processing unit 81a1 may set a timing earlier or later than the timing at which the voltage V is presumed to fall below the threshold Vth to be the next determination timing of the voltage determination. In addition, the processing unit 81a1 may set, for example, a timing at which a predetermined period of time has elapsed from the determination timing of the most recent voltage determination to be the next determination timing of the voltage determination without considering the rate of decrease of the voltage V.

For example, in the above description, the case has been described in which the vehicle 1 is an electric automobile that includes the traveling motor 30 as a driving source. However, the vehicle 1 may be a hybrid vehicle that includes an engine as another driving source in addition to the traveling motor 30. In this case, as in the above-described case, the control unit 81b1 causes the electric power to be supplied from the main battery 10 to the auxiliary battery 50 via the DC-DC converter 40 in the charging control. Alternatively, the vehicle 1 may be an internal combustion engine vehicle that includes an engine as a driving source instead of the traveling motor 30. In this case, in the charging control, the control unit 81b1 drives an alternator that is mounted in the vehicle 1 so as to supply electric power generated by the alternator to the auxiliary battery 50. As a result, the auxiliary battery 50 can be charged.

Effects of Control Device

Effects of the control device 80 according to the embodiment of the disclosure will now be described.

The processor 81 of the control device 80 according to the present embodiment executes processing including temporarily executing the voltage determination for determining whether the voltage V of the auxiliary battery 50 is equal to or less than the threshold Vth in a situation where the ignition of the vehicle 1 is turned off, executing the charging control for charging the auxiliary battery 50 when it is determined in the voltage determination that the voltage V is equal to or less than the threshold Vth, and setting the determination timing at which the voltage determination is executed on the basis of the operating state of the auxiliary equipment 60. As a result, the timing at which the voltage determination is executed can be changed in accordance with the operating state of the auxiliary equipment 60. Consequently, the voltage determination can be executed at a timing close to the timing at which the voltage V of the auxiliary battery 50 falls below the threshold Vth. Therefore, even if the ignition of the vehicle 1 is turned off in a state where the auxiliary equipment 60 is operating, depletion of the electric power of the auxiliary battery 50 can be suppressed. In addition, since the timing at which the voltage determination is executed can be changed in accordance with the operating state of the auxiliary equipment 60, the execution of unnecessarily voltage determination at an excessively high frequency can be suppressed, and unnecessary power consumption associated with the voltage determination can also be suppressed.

In addition, the processor 81 of the control device 80 according to the present embodiment may execute processing including estimating the rate of decrease of the voltage V on the basis of the operating state of the auxiliary equipment 60 and setting the first determination timing of the voltage determination, which occurs after the ignition has been turned off, on the basis of the voltage V when the ignition is turned off and an estimated rate of decrease of the voltage V. As a result, after accurately estimating the rate of decrease of the voltage V, which can be changed in accordance with the operating state of the auxiliary equipment 60, by taking the operating state of the auxiliary equipment 60 into account, the first determination timing of the voltage determination can be set. Consequently, the first voltage determination can be executed at a timing close to the timing at which the voltage V of the auxiliary battery 50 falls below the threshold Vth.

In addition, the processor 81 of the control device 80 according to the present embodiment may execute processing including estimating the rate of decrease of the voltage V on the basis of the temperature of the auxiliary battery 50 in addition to the operating state of the auxiliary equipment 60. As a result, the rate of decrease of the voltage V can be more accurately estimated by taking the temperature of the auxiliary battery 50 into account. Consequently, execution of the first voltage determination at a timing close to the timing at which the voltage V of the auxiliary battery 50 falls below the threshold Vth is more appropriately achieved.

In addition, the processor 81 of the control device 80 according to the present embodiment may execute processing including estimating the rate of decrease of the voltage V on the basis of the degree of degradation of the auxiliary battery 50 in addition to the operating state of the auxiliary equipment 60. As a result, the rate of decrease of the voltage V can be more accurately estimated by taking the degree of degradation of the auxiliary battery 50 into account. Consequently, execution of the first voltage determination at a timing close to the timing at which the voltage V of the auxiliary battery 50 falls below the threshold Vth is more appropriately achieved.

In addition, when it is determined in the voltage determination that the voltage V is greater than the threshold Vth, the processor 81 of the control device 80 according to the present embodiment may execute processing including setting the next determination timing of the voltage determination without executing the charging control. As a result, the voltage determination can be executed again when, for example, the transition of the voltage V deviates significantly from a presumed transition, and the charging control can be executed when the voltage V of the auxiliary battery 50 falls below the threshold Vth.

In addition, when it is determined in the voltage determination that the voltage V is greater than the threshold Vth, the processor 81 of the control device 80 according to the present embodiment may execute processing including identifying the actual rate of decrease of the voltage V after the ignition has been turned off and setting the next determination timing of the voltage determination on the basis of the voltage V at the voltage determination and the actual rate of decrease of the voltage V. As a result, after accurately identifying the rate of decrease of the voltage V by taking the actual transition of the voltage V into account, the next determination timing of the voltage determination can be set. Consequently, the next voltage determination can be executed at a timing close to the timing at which the voltage V of the auxiliary battery 50 falls below the threshold Vth.

In addition, when it is determined in the voltage determination that the voltage V is greater than the threshold Vth, the processor 81 of the control device 80 according to the present embodiment may execute processing including setting the next determination timing of the voltage determination on the basis of the voltage V at the voltage determination and the estimated rate of decrease of the voltage V when the estimated rate of decrease of the voltage V is greater than the actual rate of decrease of the voltage V. As a result, the next determination timing of the voltage determination can be advanced compared with the case where the next determination timing of the voltage determination is set on the basis of the actual rate of decrease of the voltage V. Consequently, the charging control can be executed with higher certainty before the voltage of the auxiliary battery 50 is depleted.

In addition, when it is determined in the voltage determination that the voltage V is equal to or less than the threshold Vth, the processor 81 of the control device 80 according to the present embodiment may execute processing including outputting information relating to the operating state of the auxiliary equipment 60. As a result, for example, it is possible to notify the driver of the vehicle 1 that is parked that the auxiliary equipment 60 is operating in the vehicle 1, and the driver can be prompted to return to the vehicle 1 and stop the operation of the auxiliary equipment 60.

The vehicle 1 according to the present embodiment may include the traveling motor 30, the main battery 10 that stores the electric power to be supplied to the traveling motor 30, and a voltage conversion device that is provided between the main battery 10 and the auxiliary battery 50. In the charging control, the processor 81 may execute processing including supplying the electric power from the main battery 10 to the auxiliary battery 50 via the voltage conversion device. As a result, charging of the auxiliary battery 50 through the charging control is appropriately achieved. Note that, in the above-described case, the DC-DC converter 40 corresponds to the voltage conversion device.

Although a preferred embodiment of the disclosure has been described with reference to the accompanying drawings, it is needless to say that the disclosure is not limited to the above-described embodiment. It is obvious that various changes and modifications within the scope described in the claims are also fall within the technical scope of the disclosure.

For example, the processing operations described with reference to the flowcharts in the present specification may not necessarily be executed in the order illustrated in the flowcharts. Additional processing steps may be employed, and some processing steps may be omitted.

According to the disclosure, depletion of an electric power of an auxiliary battery can be suppressed.

The invention claimed is:

1. A control device for a vehicle, the control device comprising:
   auxiliary equipment;
   an auxiliary battery that is configured to store electric power to be supplied to the auxiliary equipment;
   at least one processor; and
   at least one memory coupled to the at least one processor, wherein the at least one processor is configured to execute processing including
   temporarily executing voltage determination for determining whether a voltage of the auxiliary battery is equal to or less than a threshold in a situation where an ignition of the vehicle is turned off, executing charging control for charging the auxiliary battery when it is determined in the voltage determination that the voltage is equal to or less than the threshold, and setting a determination timing at which the voltage determination is executed based on an operating state of the auxiliary equipment.

2. The control device according to claim 1,
wherein the at least one processor is configured to execute processing including estimating a rate of decrease of the voltage based on the operating state of the auxiliary equipment, and setting the determination timing for a first time of the voltage determination, which occurs after the ignition has been turned off, based on the voltage when the ignition is turned off and an estimated rate of decrease of the voltage.

3. The control device according to claim 2,
wherein estimating the rate of decrease of the voltage is based on a temperature of the auxiliary battery in addition to the operating state of the auxiliary equipment.

4. The control device according to claim 2,
wherein estimating the rate of decrease of the voltage is based on a degree of degradation of the auxiliary battery in addition to the operating state of the auxiliary equipment.

5. The control device according to claim 3,
wherein estimating the rate of decrease of the voltage is based on a degree of degradation of the auxiliary battery in addition to the operating state of the auxiliary equipment.

6. The control device according to claim 1,
wherein the at least one processor is configured to execute, when it is determined in the voltage determination that the voltage is greater than the threshold, processing including setting the determination timing for a next time of the voltage determination without executing the charging control.

7. The control device according to claim 6,
wherein, when it is determined in the voltage determination that the voltage is greater than the threshold, the at least one processor is configured to execute processing including identifying an actual rate of decrease of the voltage after the ignition has been turned off, and setting the determination timing for a next time of the voltage determination based on the voltage at the voltage determination and the actual rate of the rate of decrease of the voltage.

8. The control device according to claim 7,
wherein the at least one processor is configured to execute, when it is determined in the voltage determination that the voltage is greater than the threshold, processing including setting the determination timing for a next time of the voltage determination based on the voltage at the voltage determination and the estimated rate of decrease of the voltage when the estimated rate of decrease of the voltage is greater than the actual rate of decrease of the voltage.

9. The control device according to claim 1,
wherein the at least one processor is configured to execute, when it is determined in the voltage determination that the voltage is equal to or less than the threshold, processing including outputting information relating to the operating state of the auxiliary equipment.

10. The control device according to claim 1,
wherein the vehicle comprises a traveling motor, a main battery that is configured to store electric power to be supplied to the traveling motor, and a voltage conversion device provided between the main battery and the auxiliary battery, and wherein, in the charging control, the at least one processor is configured to execute processing including supplying electric power from the main battery to the auxiliary battery via the voltage conversion device.

* * * * *